US012703205B2

(12) United States Patent
Ishizu

(10) Patent No.: US 12,703,205 B2
(45) Date of Patent: Aug. 11, 2026

(54) TIRE

(71) Applicant: The Yokohama Rubber Co., LTD., Tokyo (JP)

(72) Inventor: Kento Ishizu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/041,699

(22) PCT Filed: Aug. 24, 2021

(86) PCT No.: PCT/JP2021/031013
§ 371 (c)(1),
(2) Date: Feb. 15, 2023

(87) PCT Pub. No.: WO2022/045143
PCT Pub. Date: Mar. 3, 2022

(65) Prior Publication Data

US 2024/0262135 A1 Aug. 8, 2024

(30) Foreign Application Priority Data

Aug. 24, 2020 (JP) ................................ 2020-141134

(51) Int. Cl.
*B60C 11/03* (2006.01)
*B60C 11/12* (2006.01)
*B60C 11/13* (2006.01)

(52) U.S. Cl.
CPC .......... *B60C 11/1353* (2013.01); *B60C 11/12* (2013.01); *B60C 2011/1254* (2013.01)

(58) Field of Classification Search
CPC ................. B60C 11/1353; B60C 11/12; B60C 2011/1254; B60C 11/0302;
(Continued)

(56) References Cited

U.S. PATENT DOCUMENTS 4,387,754 A * 6/1983 Mirtain .................. B60C 11/04 152/209.1
2017/0015144 A1 1/2017 Ogihara
(Continued)

FOREIGN PATENT DOCUMENTS

CN 105172478 A 12/2015
CN 105691112 A 6/2016
(Continued)

OTHER PUBLICATIONS

Iwasaki, English Machine Translation of JP 2016107842, 2016 (Year: 2016).*

(Continued)

*Primary Examiner* — Katelyn W Smith
*Assistant Examiner* — Brendon Charles Darby
(74) *Attorney, Agent, or Firm* — Thorpe North & Western, LLP

(57) ABSTRACT

Provided in a tire are a second land portion defined by a shoulder main groove and a center main groove extending in a circumferential direction, and sets of first and second lug grooves that extend in the second land portion in a width direction and are disposed alternately in the circumferential direction. The first lug groove opens to the shoulder main groove and terminates inside the second land portion in which the groove width on one end side is formed wider than the groove width on the other end side, and the second lug groove opens to the center main groove and terminates inside the second land portion in which the groove width on one end side is formed narrower than the groove width on the other end side and the one end side of the second lug groove that is formed narrower is closed at ground contact.

19 Claims, 7 Drawing Sheets

(58) Field of Classification Search
CPC ......... B60C 11/0304; B60C 2011/0386; B60C 11/1369; B60C 11/04; B60C 2011/0383; B60C 2011/0381; B60C 2011/0388; B60C 11/1281
See application file for complete search history.

(56) References Cited

U.S. PATENT DOCUMENTS

2017/0320360 A1 11/2017 Yamakawa
2018/0065417 A1* 3/2018 Hoshiba .............. B60C 11/1263
2018/0154698 A1* 6/2018 Takahashi ........... B60C 11/1204
2019/0322140 A1* 10/2019 Nukushina .............. B60C 11/24
2023/0241924 A1* 8/2023 Kidesaki ............. B60C 11/1263
152/209.8

FOREIGN PATENT DOCUMENTS

EP 2202098 A1 * 6/2010 ......... B60C 11/0304
EP 4 201 707 A1 6/2023
JP 2012-1155 A 1/2012
JP 2013-139166 A 7/2013
JP 5452561 B2 3/2014
JP 2014-223915 A 12/2014
JP 2015-54602 A 3/2015
JP 2015-231812 A 12/2015
JP 2016107842 A * 6/2016
JP 2017-024542 A 2/2017
JP 2017-95044 A 6/2017
JP 6496135 B2 4/2019
JP 2020-66279 A 4/2020
WO 2013/042023 A1 3/2013

OTHER PUBLICATIONS

Mukai, English Machine Translation of JP 2015231812, 2015 (Year: 2015).*
Extended European Search Report for Application No. PCT/JP2021031013, dated Sep. 11, 2024.

* cited by examiner

| | Conventional Example | Comparative Example | Example 1 | Example 2 |
|---|---|---|---|---|
| First lug groove of second land portion | Two sides open | One side terminating | One side terminating | One side terminating |
| Second lug groove of second land portion | Two sides open | One side terminating | One side terminating | One side terminating |
| Groove width of first lug groove | Constant groove width | Opening side broad | Opening side broad | Opening side broad |
| Groove width of second lug groove | Constant groove width | Opening side narrow | Opening side narrow | Opening side narrow |
| Presence of closing at ground contact on opening side of second lug groove | No | No | Yes | Yes |
| Groove width ratio Wa1/Wa2 of first lug groove | 1.00 | 1.20 | 1.20 | 3.50 |
| Groove width ratio Wb1/Wb2 of second lug groove | 1.00 | 0.85 | 0.85 | 0.85 |
| Ratio W2/W1 of land portion width and overlap region width | 1.00 | 0.80 | 0.80 | 0.80 |
| Inclination angle θ1 of first lug groove (°) | 90 | 90 | 90 | 90 |
| Inclination angle θ2 of second lug groove (°) | 90 | 90 | 90 | 90 |
| Angle difference θ2 - θ1 (°) | 0 | 0 | 0 | 0 |
| Presence of raised bottom portion of first lug groove, second lug groove | No | No | No | No |
| Ratio of lug groove length and raised bottom portion length | 0 | 0 | 0 | 0 |
| Presence of opening of first sipe | Yes | Yes | Yes | Yes |
| Presence of separated portion of sipe in overlapping region | No | No | No | No |
| Braking performance on ice (index value) | 100 | 102 | 104 | 102 |
| Braking performance on snow (index value) | 100 | 99 | 102 | 104 |
| Wet braking performance (index value) | 100 | 101 | 103 | 106 |

FIG. 4A

| | Example 3 | Example 4 | Example 5 | Example 6 |
|---|---|---|---|---|
| First lug groove of second land portion | One side terminating | One side terminating | One side terminating | One side terminating |
| Second lug groove of second land portion | One side terminating | One side terminating | One side terminating | One side terminating |
| Groove width of first lug groove | Opening side broad | Opening side broad | Opening side broad | Opening side broad |
| Groove width of second lug groove | Opening side narrow | Opening side narrow | Opening side narrow | Opening side narrow |
| Presence of closing at ground contact on opening side of second lug groove | Yes | Yes | Yes | Yes |
| Groove width ratio Wa1/Wa2 of first lug groove | 1.65 | 1.65 | 1.65 | 1.65 |
| Groove width ratio Wb1/Wb2 of second lug groove | 0.85 | 0.15 | 0.50 | 0.50 |
| Ratio W2/W1 of land portion width and overlap region width | 0.80 | 0.80 | 0.80 | 0.40 |
| Inclination angle θ1 of first lug groove (°) | 90 | 90 | 90 | 90 |
| Inclination angle θ2 of second lug groove (°) | 90 | 90 | 90 | 90 |
| Angle difference θ2 - θ1 (°) | 0 | 0 | 0 | 0 |
| Presence of raised bottom portion of first lug groove, second lug groove | No | No | No | No |
| Ratio of lug groove length and raised bottom portion length | 0 | 0 | 0 | 0 |
| Presence of opening of first sipe | Yes | Yes | Yes | Yes |
| Presence of separated portion of sipe in overlapping region | No | No | No | No |
| Braking performance on ice (index value) | 102 | 103 | 104 | 102 |
| Braking performance on snow (index value) | 104 | 102 | 104 | 102 |
| Wet braking performance (index value) | 105 | 104 | 103 | 101 |

FIG. 4B

| | Example 7 | Example 8 | Example 9 | Example 10 |
|---|---|---|---|---|
| First lug groove of second land portion | One side terminating | One side terminating | One side terminating | One side terminating |
| Second lug groove of second land portion | One side terminating | One side terminating | One side terminating | One side terminating |
| Groove width of first lug groove | Opening side broad | Opening side broad | Opening side broad | Opening side broad |
| Groove width of second lug groove | Opening side narrow | Opening side narrow | Opening side narrow | Opening side narrow |
| Presence of closing at ground contact on opening side of second lug groove | Yes | Yes | Yes | Yes |
| Groove width ratio Wa1/Wa2 of first lug groove | 1.65 | 1.65 | 1.65 | 1.65 |
| Groove width ratio Wb1/Wb2 of second lug groove | 0.50 | 0.50 | 0.50 | 0.50 |
| Ratio W2/W1 of land portion width and overlap region width | 0.60 | 0.60 | 0.60 | 0.60 |
| Inclination angle θ1 of first lug groove (°) | 90 | 105 | 105 | 105 |
| Inclination angle θ2 of second lug groove (°) | 90 | 105 | 115 | 115 |
| Angle difference θ2 - θ1 (°) | 0 | 0 | 10 | 10 |
| Presence of raised bottom portion of first lug groove, second lug groove | No | No | No | Yes |
| Ratio of lug groove length and raised bottom portion length | 0 | 0 | 0 | 0.20 |
| Presence of opening of first sipe | Yes | Yes | Yes | Yes |
| Presence of separated portion of sipe in overlapping region | No | No | No | No |
| Braking performance on ice (index value) | 104 | 103 | 102 | 103 |
| Braking performance on snow (index value) | 103 | 104 | 106 | 105 |
| Wet braking performance (index value) | 102 | 104 | 105 | 105 |

FIG. 4C

| | Example 11 | Example 12 | Example 13 | Example 14 |
|---|---|---|---|---|
| First lug groove of second land portion | One side terminating | One side terminating | One side terminating | One side terminating |
| Second lug groove of second land portion | One side terminating | One side terminating | One side terminating | One side terminating |
| Groove width of first lug groove | Opening side broad | Opening side broad | Opening side broad | Opening side broad |
| Groove width of second lug groove | Opening side narrow | Opening side narrow | Opening side narrow | Opening side narrow |
| Presence of closing at ground contact on opening side of second lug groove | Yes | Yes | Yes | Yes |
| Groove width ratio Wa1/Wa2 of first lug groove | 1.65 | 1.65 | 1.65 | 1.65 |
| Groove width ratio Wb1/Wb2 of second lug groove | 0.50 | 0.50 | 0.50 | 0.50 |
| Ratio W2/W1 of land portion width and overlap region width | 0.60 | 0.60 | 0.60 | 0.60 |
| Inclination angle θ1 of first lug groove (°) | 105 | 105 | 105 | 105 |
| Inclination angle θ2 of second lug groove (°) | 115 | 115 | 115 | 115 |
| Angle difference θ2 - θ1 (°) | 10 | 10 | 10 | 10 |
| Presence of raised bottom portion of first lug groove, second lug groove | Yes | Yes | Yes | Yes |
| Ratio of lug groove length and raised bottom portion length | 0.50 | 0.35 | 0.35 | 0.35 |
| Presence of opening of first sipe | Yes | Yes | No | No |
| Presence of separated portion of sipe in overlapping region | No | No | No | Yes |
| Braking performance on ice (index value) | 105 | 104 | 105 | 106 |
| Braking performance on snow (index value) | 104 | 105 | 104 | 104 |
| Wet braking performance (index value) | 103 | 104 | 104 | 104 |

FIG. 4D

TIRE

TECHNICAL FIELD

The present technology relates to a tire and particularly relates to a tire provided with a plurality of lug grooves in a land portion.

BACKGROUND ART

Generally, performance on snow and performance on ice are required for studless tires. The technologies described in Japan Patent Nos. 5452561 B and 6496135 B and in Japan Unexamined Patent Publication No. 2017/024542 A are known studless tires in the related art.

Incidentally, in recent years, wet performance has been required for studless tires in addition to performance on snow and performance on ice.

SUMMARY

The present technology provides a tire whereby performance on snow, performance on ice, and wet performance can be provided in a compatible manner.

A tire according to the present technology includes two circumferential main grooves that extend in a tire circumferential direction, a land portion defined by the circumferential main grooves, and a plurality of sets of a first lug groove and a second lug groove that extend in a direction intersecting the circumferential main grooves in the land portion and are alternately disposed in the tire circumferential direction, the first lug groove including one end that opens to one of the circumferential main grooves and an other end that terminates inside the land portion, a groove width on a side of the one end being formed wider than a groove width on a side of the other end, and the second lug groove including one end that opens to an other one of the circumferential main grooves and an other end that terminates inside the land portion, a groove width on a side of the one end being formed narrower than a groove width on a side of the other end, and the side of the one end of the second lug groove that is formed narrower being closed at ground contact.

In the tire described above, preferably, the first lug groove has a groove width Wa1 on the side of the one end and a groove width Wa2 on the side of the other end satisfying a relationship $1.50 \le Wa1/Wa2 \le 3.00$, and the second lug groove has a groove width Wb1 on the side of the one end and a groove width Wb2 on the side of the other end satisfying a relationship $0.20 \le Wb1/Wb2 \le 0.75$.

Additionally, in the tire described above, preferably, the first lug groove and the second lug groove each include a groove width change portion in which a groove width changes, and each groove width change portion is provided in a region in which the first lug groove and the second lug groove overlap in a tire width direction.

Additionally, in the tire described above, preferably, a width W2 of the region in the tire width direction and a maximum width W1 of the land portion in the tire width direction satisfy a relationship $0.50 \le W2/W1 \le 0.70$.

Further, in the tire described above, preferably, the first lug groove and the second lug groove are inclined in mutually opposite directions with respect to the tire circumferential direction, and inclination angles θ1, θ2 of the first lug groove and the second lug groove with respect to the tire circumferential direction satisfy $95° \le \theta1 \le 125°$, $95° \le \theta2 \le 125°$, and $5° \le \theta2 - \theta1 \le 15°$, respectively.

Further, in the tire described above, preferably, the first lug groove and the second lug groove each include a raised bottom portion including a groove bottom raised on the side of the other end, and lengths La1, Lb1 of the raised bottom portion in the tire width direction and each of length La, Lb of the first lug groove and the second lug groove in the tire width direction satisfy relationships $0.30 \le La1/La \le 0.40$ and $0.30 \le Lb1/Lb \le 0.40$, respectively.

Additionally, in the tire described above, preferably, one of the circumferential main grooves includes a groove wall that forms an edge of the land portion and has a straight shape, and the other one of the circumferential main grooves includes a groove wall that forms an edge of the land portion and has a zigzag shape in which the groove wall oscillates in the tire width direction while extending in the tire circumferential direction.

Further, in the tire described above, preferably, the land portion includes a plurality of sipes extending in the tire width direction, and of the plurality of sipes, a sipe disposed on the side of the one end of the first lug groove and adjacent to the first lug groove in the tire circumferential direction includes an end portion toward one of the circumferential main grooves that terminates inside the land portion, and a sipe disposed on the side of the one end of the second lug groove and adjacent to the second lug groove in the tire circumferential direction opens to the other one of the circumferential main grooves.

Additionally, in the tire described above, preferably, the land portion includes a separated portion in which the plurality of sipes are disposed separated in the tire width direction, and the separated portion is provided in a region in which the first lug groove and the second lug groove overlap in the tire width direction.

Further, in the tire described above, preferably, the land portion in which the first lug groove and the second lug groove are disposed is disposed on an inner side in a vehicle width direction demarcated by a tire equatorial plane when a tire is mounted on a vehicle.

The tire according to an embodiment of the present technology includes a plurality of sets of a first lug groove and a second lug groove disposed alternately in the tire circumferential direction and each having an other end terminating inside the land portion, and thus rigidity of the land portion can be improved, improving performance on ice. Additionally, the groove width of the second lug groove on one end side opening to the other circumferential main groove is formed narrower than the groove width on the other end side, and this narrower opening portion is closed at ground contact, and thus the snow column shear force is improved, improving performance on snow. Furthermore, the groove width of the first lug groove on one end side opening to one circumferential main groove is formed wider than the groove width on the other end side, and thus the drainage properties are improved, improving wet performance. Therefore, the tire according to the present technology can provide performance on snow, performance on ice, and wet performance in a compatible manner.

BRIEF DESCRIPTION OF DRAWINGS

FIGS. 4A-4D include a table indicating the results of performance evaluation tests of pneumatic tires.

DETAILED DESCRIPTION

Embodiments of the present technology will be described in detail below with reference to the drawings. However, the technology is not limited to the embodiment. Constituents of the embodiment include elements that are essentially identical or that can be substituted or easily conceived by one skilled in the art.

A pneumatic tire according to the present embodiment will be described. In the following description, a tire radial direction refers to a direction orthogonal to a rotation axis of the tire, an inner side in the tire radial direction refers to a side toward the rotation axis in the tire radial direction, and an outer side in the tire radial direction refers to a side away from the rotation axis in the tire radial direction. In addition, a tire circumferential direction refers to a circumferential direction about the rotation axis as a center axis. Moreover, a tire width direction refers to a direction parallel to the rotation axis, an inner side in the tire width direction refers to a side toward a tire equatorial plane (tire equator line) in the tire width direction, and an outer side in the tire width direction refers to a side away from the tire equatorial plane in the tire width direction. Note that "tire equatorial plane" refers to the plane orthogonal to the rotation axis of the pneumatic tire, the plane passing through the center of the tire width.

Figure 1:
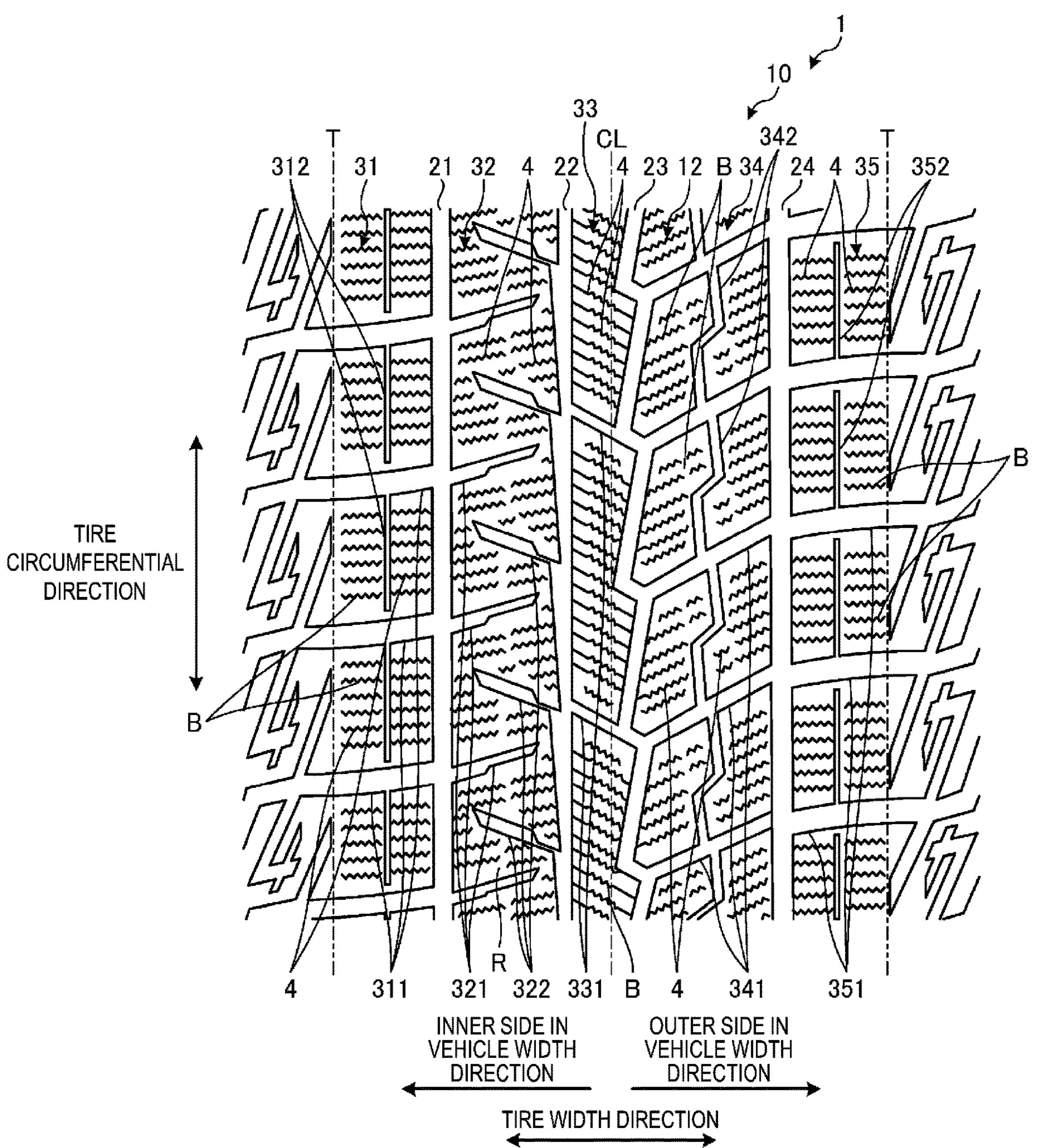
FIG. 1 is a plan view illustrating a tread surface of a pneumatic tire according to the present embodiment.

FIG. 1 is a plan view of a tread surface of the pneumatic tire according to the present embodiment. In FIG. 1, a reference sign CL denotes the tire equatorial plane, and reference signs T denote tire ground contact edges, respectively. Additionally, a pneumatic tire 1 according to the present embodiment (hereinafter, also referred to simply as "tire 1") is specified in the mounting direction with respect to the vehicle, and in the example of FIG. 1, it has a left-right asymmetric tread pattern centered on the tire equatorial plane CL. Note that in FIG. 1, the region illustrated on the outer side in the tire width direction of the ground contact edge T includes a so-called sidewall portion. The ground contact edge Tis defined as a maximum width position in the tire axial direction of the contact surface between the tire 1 and a flat plate when the tire 1 is mounted on a specified rim, inflated to a specified internal pressure, placed perpendicular to the flat plate in a static state, and loaded with a load corresponding to a specified load.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

A tread portion 10 of the tire 1 is made of a rubber material (tread rubber) and is exposed on the outermost side of the tire 1 in the tire radial direction, with the surface thereof constituting the contour of the tire 1. The surface of the tread portion 10 forms a tread surface 12 that is a surface that comes into contact with the road surface when a vehicle (not illustrated) on which the tire 1 is mounted is driven.

The tire 1 includes, in the tread surface 12, a plurality of circumferential main grooves 21 to 24 extending in the tire circumferential direction, a plurality of land portions 31 to 35 defined by the circumferential main grooves 21 to 24, a plurality of lug grooves 311, 321, 322, 331, 341, and 351 disposed in each of the land portions 31 to 35, and a plurality of sipes 4 disposed in each of the land portions 31 to 35. Here, "circumferential main groove" refers to a groove extending in the tire circumferential direction on which a wear indicator must be provided as specified by JATMA and typically has a groove width of 5.0 mm or more and a groove depth of 6.5 mm or more. "Lug groove" refers to a lateral groove extending in a direction intersecting the circumferential main groove (tire width direction) and typically having a groove width of 1.0 mm or more and a groove depth of 3.0 mm or more. Further, "sipe" refers to a cut formed in the tread surface and typically has a sipe width of less than 1.0 mm and a sipe depth of 2.0 mm or more, such that the sipe is closed when the tire comes into contact with the ground. Accordingly, the tire 1 of the present embodiment is configured as a studless tire provided with the sipe 4 on the tread surface 12.

A plurality (four in FIG. 1) of circumferential main grooves 21 to 24 that extend in the tire circumferential direction are provided on the tread surface 12 at predetermined intervals in the tire width direction respectively. In the present embodiment, with the tire equatorial plane CL as the boundary, two circumferential main grooves 21, 22 are provided on the inner side in the vehicle width direction, and two circumferential main grooves 23, 24 are provided on the outer side in the vehicle width direction, respectively, as illustrated in FIG. 1. Here, the inner side in the vehicle width direction and the outer side in the vehicle width direction are specified as orientations with respect to the vehicle width direction when the tire 1 is mounted on the vehicle. Additionally, two circumferential main grooves 21, 24 on the outermost side in the tire width direction are defined as shoulder main grooves, and two circumferential main grooves 22, 23 on the inner side in the tire width direction are defined as center main grooves.

In the example of FIG. 1, the shoulder main grooves 21, 24 each have straight shapes. In contrast, the center main grooves 22, 23 oscillate in the tire width direction while extending in the tire circumferential direction to form zigzag shapes. In particular, the center main groove 22 on the inner side in the vehicle width direction has a groove wall on the tire equatorial plane CL side having a straight shape, while a groove wall on the ground contact edge T side oscillates in the tire width direction while extending in the tire circumferential direction to form a zigzag shape. Note that the number of circumferential main grooves is not limited to the above, and three or five or more circumferential main grooves may be disposed on the tread surface 12.

A plurality of (five in FIG. 1) land portions 31 to 35 extending in the tire circumferential direction are defined and formed by the four circumferential main grooves 21 to 24 on the tread surface 12. In the present embodiment, the land portions 31, 35 defined on the outer side in the tire width direction by the shoulder main grooves 21, 24 respectively are defined as shoulder land portions. Furthermore, the land portions 32, 34 defined on the inner side in the tire width direction by the shoulder main grooves 21, 24 are defined as second land portions. The second land portions 32, 34 are adjacent to the shoulder land portions 31, 35 with the above-described circumferential main grooves 21, 24 disposed respectively therebetween. Additionally, a land portion 33 defined between the center main grooves 22, 23 is defined as a center land portion. The center land portion 33 is provided extending on the tire equatorial plane CL.

Note that in the example of FIG. 1, only the single center land portion 33 exists, but in a configuration with five or more circumferential main grooves, a plurality of center land portions are formed. Furthermore, in a configuration with three circumferential main grooves, the center land portion may also serve as the second land portion.

The left and right shoulder land portions 31, 35 include a plurality of lug grooves 311, 351, respectively. Each of the lug grooves 311, 351 has one end opening to the shoulder main grooves 21, 24, respectively, and extends in the outer side in the tire width direction, and has an other end opening in a region across the ground contact edge T. A plurality of lug grooves 311, 351 are provided repeatedly in the tire circumferential direction in the shoulder land portions 31, 35, respectively. Accordingly, the shoulder land portions 31, 35 are partitioned into a plurality of blocks B (shoulder blocks) by the lug grooves 311, 351, respectively. The blocks B include circumferential narrow grooves 312, 352 each extending in the tire circumferential direction, and a plurality of sipes 4 extending in the tire width direction. In the example of FIG. 1, the circumferential narrow grooves 312, 352 are formed in a straight shape.

Additionally, the second land portion 32 on the inner side in the vehicle width direction includes two types of a plurality of sets of lug grooves 321, 322, and a plurality of sipes 4 extending in the tire width direction. The lug groove 321 (first lug groove) has one end facing one end of the above-mentioned lug groove 311 and opening to the shoulder main groove 21, and an other end terminating inside the second land portion 32. Further, the lug groove 322 (second lug groove) has one end opening to the center main groove 22 and an other end terminating inside the second land portion 32. In the example of in FIG. 1, one end of the lug groove 322 opens to a corner portion of the center main groove 22 having a zigzag shape that projects on the ground contact edge T side. Therefore, the lug grooves 321, 322 have a semi-closed structure that does not cross the second land portion 32. Additionally, the lug grooves 321, 322 are disposed in a staggered manner (alternately) in the tire circumferential direction, and each extend so as to be inclined in opposite directions with respect to the tire circumferential direction, and overlap each other in the tire width direction. Accordingly, the second land portion 32 is formed as a rib R that is continuous in the tire circumferential direction without being divided in the tire circumferential direction by the lug grooves 321, 322.

The center land portion 33 includes a plurality of lug grooves 331. The lug groove 331 is formed extending in the tire width direction between the two center main grooves 22, 23, and both end portions are open to the center main grooves 22, 23, respectively. In the example of in FIG. 1, one end of the lug groove 331 opens to a corner portion projecting on the tire equatorial plane CL side in the zigzag-shaped center main groove 23, and extends along the extension direction of the short portion of the center main groove 23. Further, the lug groove 331 is provided with respect to every other corner portion that forms the zigzag of the center main groove 23. The center land portion 33 is partitioned into a plurality of blocks B by a plurality of lug grooves 331, and a plurality of sipes 4 extending in the tire width direction are provided in each block B.

The second land portion 34 on the outer side in the vehicle width direction includes a plurality of lug grooves 341. The lug groove 341 is formed extending in the tire width direction between the adjacent center main groove 23 and a shoulder main groove 24, and one end opens to the center main groove 23, and an other end opens to the shoulder main groove 24. In the example of FIG. 1, one end of the lug groove 341 opens to a corner portion projecting on the ground contact edge T side of the zigzag-shaped center main groove 23, and an other end opens to the shoulder main groove 24 facing one end of the lug groove 351 described above. The second land portion 34 is partitioned into a plurality of blocks B by a plurality of lug grooves 341. The blocks B include a circumferential narrow groove 342 and a plurality of sipes 4 each extending in the tire width direction. In the example of FIG. 1, the circumferential narrow groove 342 is formed in a zigzag shape that oscillates in the tire width direction while extending in the tire circumferential direction.

Note that the pneumatic tire 1 according to the present embodiment has a meridian cross-section shape similar to that of a known pneumatic tire. Here, the meridian cross-section form of the pneumatic tire refers to the cross-sectional shape of the pneumatic tire as it appears on a plane normal to the tire equatorial plane CL. The tire 1 according to the present embodiment has a bead portion, a sidewall portion, a shoulder portion, and a tread portion 10 from the inner side to the outer side in the tire radial direction in a tire meridian cross-sectional view, not illustrated. Further, in the tire meridian cross-sectional view; for example, the tire 1 includes a carcass layer extending from the tread portion 10 to the bead portions on both sides and wound around a pair of bead cores, and a belt layer and a belt reinforcing layer provided in that order on the above-described carcass layer on the outer side in the tire radial direction.

Incidentally, in the development of studless tires, in recent years, wet performance (drainage performance) is required in addition to performance on snow and performance on ice, and it is important to provide these performance on snow, performance on ice, and wet performance in a compatible manner. In general, it is effective to reduce the groove area of the tread pattern in improving performance on ice, while it is effective to increase the groove area of the tread pattern in improving performance on snow and wet performance. Therefore, there is a problem that it is difficult to provide performance on ice, performance on snow, and wet performance in a compatible manner. The pneumatic tire 1 according to the present embodiment employs the following configurations for providing performance on ice, performance on snow, and wet performance in a compatible manner.

Figure 2:
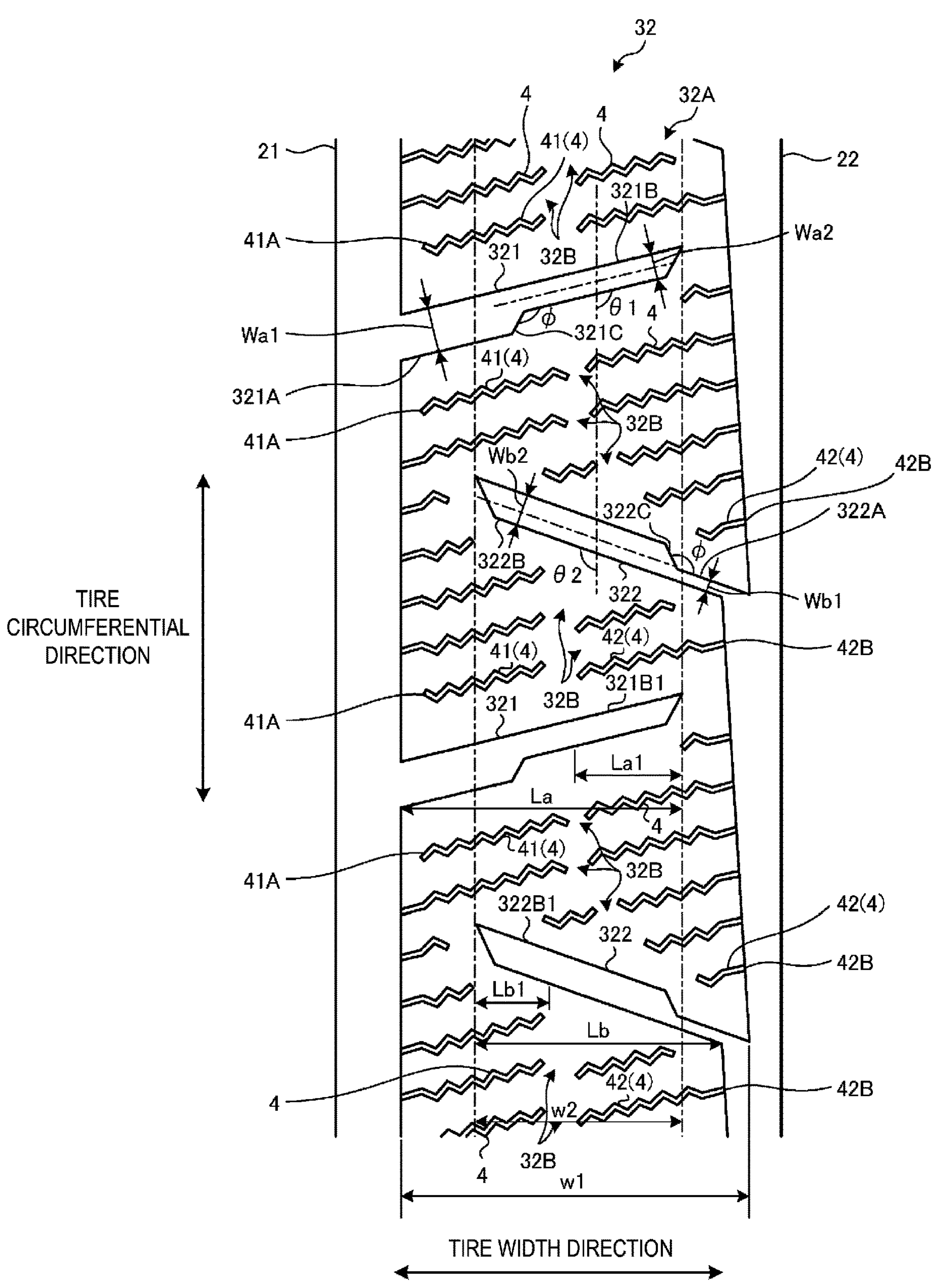
FIG. 2 is a plan view illustrating a second land portion of the tread pattern illustrated in FIG. 1 on an inner side in the vehicle width direction.

FIG. 2 is a plan view illustrating a second land portion of the tread pattern illustrated in FIG. 1 on the inner side in the vehicle width direction. As illustrated in FIG. 2, the second land portion 32 on the inner side in the vehicle width direction includes two types of a plurality of lug grooves 321, 322. These two types of lug grooves 321, 322 are lateral grooves extending in the tire width direction, and one lug groove 321 is defined as the first lug groove and the other lug groove 322 is defined as the second lug groove.

As described above, the first lug groove 321 has one end opening to the shoulder main groove 21 (one circumferential main groove) and an other end terminating inside the second land portion 32. The first lug groove 321 has a step shape in which the groove width is widened on one end side that opens to the shoulder main groove 21. Specifically, the first lug groove 321 includes a broad width portion 321A having a wider groove width on one end side that opens to the shoulder main groove 21, and a narrow width portion 321B having a narrower groove width than the broad width portion 321A on the other end side that terminates, and the broad width portion 321A and the narrow width portion 321B are connected in a straight line.

Additionally, each of the broad width portion 321A and the narrow width portion 321B is formed in a constant groove width, and a groove width change portion 321C in which the groove width changes uniformly is provided between the broad width portion 321A and the narrow width portion 321B. In the groove width change portion 321C, the length of the groove width change portion 321C in the tire width direction with respect to the length of the first lug groove 321 in the tire width direction is set to 3% or more and 10% or less, which is not illustrated. In the present embodiment, one edge portion (upper side in FIG. 2) of the first lug groove 321 has a linear shape, and the other edge portion (lower side in FIG. 2) has a step shape. The groove width change portion 321C forms a rising portion having a step shape, and an inclination angle φ of the rising portion is an obtuse angle (for example, 120° or more and 135° or less).

In the present embodiment, by providing the broad width portion 321A on one end side that opens to the shoulder main groove 21, the drainage properties from the first lug groove 321 to the shoulder main groove 21 are improved, and thus the wet performance of the tire 1 can be improved. Furthermore, since the shoulder main groove 21 to which the broad width portion 321A opens is formed in a straight shape, the drainage properties from the first lug groove 321 to the shoulder main groove 21 can be further improved.

Additionally, the groove width Wa1 of the broad width portion 321A (one end side) of the first lug groove 321 and the groove width Wa2 of the narrow width portion 321B (other end side) satisfy the relationship $1.50 \le Wa1/Wa2 \le 3.0$. The groove widths Wa1, Wa2 are measured as a maximum value of the distance between the opposing groove walls in the groove opening portion in an unloaded state in which the tire 1 is mounted on a specified rim and inflated to a specified internal pressure.

In this configuration, when $1.50 > Wa1/Wa2$, the drainage properties from the first lug groove 321 to the shoulder main groove 21 are not sufficient, and thus sufficient wet performance cannot be exhibited. In addition, when $Wa1/Wa2 > 3.0$, the rigidity of the land portion is decreased, and thus sufficient performance on ice cannot be exhibited. In contrast, this configuration satisfies $1.50 \le Wa1/Wa2 \le 3.0$, and thus performance on ice and wet performance can be improved, providing performance on ice and wet performance in a compatible manner.

On the other hand, the second lug groove 322 has one end opening to the center main groove 22 (other circumferential main groove) and an other end terminating inside the second land portion 32. The second lug groove 322 has a step shape having a narrow groove width at one end side that opens to the center main groove 22, unlike the first lug groove 321. Specifically, the second lug groove 322 includes a narrow width portion 322A having a narrow groove width on one end side that opens to the center main groove 22 and a broad width portion 322B having a wider groove width than the narrow width portion 322A on an other end side that terminates, and the narrow width portion 322A and the broad width portion 322B are connected in a straight line.

Additionally, each of the narrow width portion 322A and the broad width portion 322B is formed in a constant groove width, and a groove width change portion 322C in which the groove width changes uniformly is provided between the narrow width portion 322A and the broad width portion 322B. In the groove width change portion 322C, the length of the groove width change portion 322C in the tire width direction with respect to the length of the second lug groove 322 in the tire width direction is set to 3% or more and 10% or less, which is not illustrated. In the present embodiment, one edge portion (lower side in FIG. 2) of the second lug groove 322 has a linear shape, and the other edge portion (upper side in FIG. 2) has a step shape. The groove width change portion 322C forms a rising portion having a step shape, and the inclination angle φ of the rising portion is an obtuse angle (for example, 120° or more and 135° or less).

Additionally, the second lug groove 322 is preferably formed with the groove width Wb1 of the narrow width portion 322A (one end side) being 0.5 mm or more and 1.6 mm or less, and in the present embodiment, the groove width Wb1 is specified as 1.0 mm. Thus, the narrow width portion 322A is configured to be closed when the tire comes into contact with the ground. According to this configuration, the narrow width portion 322A is closed when the tire comes into contact with the ground, and thus snow column shear force is improved without missing snow taken in the second lug groove 322, and thus performance on snow can be improved. Further, in the present embodiment, the center main groove 22 to which the narrow width portion 322A opens is formed in a zigzag shape in which the groove wall on the opening side oscillates in the tire width direction while extending in the tire circumferential direction. Accordingly, since the groove width of the center main groove 22 changes, the length of the edge portion of the second land portion 32 on the inner side in the vehicle width direction increases, and thus the snow traction index STI is improved, and performance on snow can be further improved.

Additionally, the groove width Wb1 of the narrow width portion 322A (one end side) of the second lug groove 322 and the groove width Wb2 of the broad width portion 322B (other end side) satisfy the relationship $0.20 \le Wb1/Wb2 \le 0.75$. The groove widths Wb1, Wb2 are also measured as a maximum value of the distance between the opposing groove walls in the groove opening portion in an unloaded state in which the tire 1 is mounted on a specified rim and inflated to a specified internal pressure.

In this configuration, when $0.20 > Wb1/Wb2$, the amount of snow that can be taken into the second lug groove 322 is small, and the snow column shear force is not sufficiently improved, and thus the performance on snow cannot be sufficiently exhibited. Additionally, when $Wb1/Wb2 > 0.75$, the rigidity difference between the block central portion and the block edge portion increases, and thus ensuring the performance on ice is difficult due to the collapse of the block. In contrast, this configuration satisfies $0.20 \le Wb1/Wb2 \le 0.75$, and thus the rigidity difference between the block central portion and the block edge portion can be balanced, and performance on snow and performance on ice can be provided in a compatible manner.

Additionally, the first lug groove 321 and the second lug groove 322 are disposed in a staggered manner (alternately) in the tire circumferential direction, and overlap each other in the tire width direction. Therefore, the first lug groove 321 and the second lug groove 322 can be disposed with a gap in the second land portion 32 on the inner side in the vehicle width direction without being connected to each other. Accordingly, rigidity of the land portion of the second land portion 32 can be improved and performance on ice can be improved. In the present embodiment, each groove width change portion 321C, 322C of the first lug groove 321 and the second lug groove 322 is disposed in a region 32A where the first lug groove 321 and the second lug groove 322 overlap each other. The region 32A is a region defined by the other end of the first lug groove 321 and the other end of the second lug groove 322, and when the width of the region 32A in the tire width direction is W2 and the maximum width in the tire width direction of the second land portion 32 on the inner side in the vehicle width direction is W1, the maximum width W1 and the width W2 satisfy the relationship $0.50 \le W2/W1 \le 0.70$.

In general, rigidity of the land portion tends to decrease on the outer side (edge side) of the land portion in the tire width direction. In the present embodiment, each groove width change portion 321C, 322C is arranged in the overlapping region 32A described above, and the maximum width W1 of the second land portion 32 and the width W2 of the region 32A satisfy the relationship $0.50 \le W2/W1 \le 0.70$ so that a local bias in rigidity of the land portion can be reduced and the contact with the ground is improved, and thus performance on ice can be improved.

Further, each of the first lug groove 321 and the second lug groove 322 is inclined and extends in the direction opposite to the tire circumferential direction. Specifically, the inclination angle $\theta 1$ of the first lug groove 321 with respect to the tire circumferential direction is within the range $95° \le \theta 1 \le 125°$. Further, the inclination angle $\theta 2$ of the second lug groove 322 with respect to the tire circumferential direction is also within the range $95° \le \theta 2 \le 125°$. In the example of FIG. 2, the inclination angle $\theta 2$ is formed larger than the inclination angle $\theta 1$, and the angle difference $(\theta 2 - \theta 1)$ is preferably within the range $5° \le \theta 2 - \theta 1 \le 15°$. The inclination angles $\theta 1$, $\theta 2$ of the first lug groove 321 and the second lug groove 322 are measured as angles formed by the groove center lines of the lug grooves and the tire circumferential direction. According to this configuration, the inclination angles $\theta 1$, $\theta 2$ of the first lug groove 321 and the second lug groove 322 can be made proper, and thus the snow traction index STI at other than 0°, for example, is improved in a well-balanced manner and performance on snow can be improved.

Additionally, the first lug groove 321 and the second lug groove 322 each have a raised bottom portion having a groove bottom raised on the other end side that terminates. Specifically, the first lug groove 321 has a raised bottom portion 321B1 in the narrow width portion 321B, and the second lug groove 322 has a raised bottom portion 322B1 in the broad width portion 322B. These raised bottom portions 321B1, 322B1 are portions formed with a relatively shallow groove depth from the tread surface 12, and are set to 30% or more and 70% or less of the deepest groove depth. Additionally, the raised bottom portions 321B1, 322B1 are formed along the tire width direction from the other end (tip) toward one end of the first lug groove 321 and the second lug groove 322, respectively. In the present embodiment, the length La1 of the raised bottom portion 321B1 in the tire width direction and the length La of the first lug groove 321 in the tire width direction satisfy the relationship $0.30 \le La1/La \le 0.40$, and the length Lb1 of the raised bottom portion 322B1 in the tire width direction and the length Lb of the second lug groove 322 in the tire width direction satisfy the relationship $0.30 \le Lb1/Lb \le 0.40$.

In this case, when the relationship between the lengths La1, Lb1 of the raised bottom portions 321B1, 322B1 and the lengths La, Lb of the first lug groove 321, the second lug groove 322 is less than 0.30, the rigidity of the land portion is relatively decreased, and thus performance on ice is decreased. In addition, when the relationship between the lengths La1, Lb1 of the raised bottom portions 321B1, 322B1 and the lengths La, Lb of the first lug groove 321, the second lug groove 322 is greater than 0.40, the amount of snow that can be taken into the first lug groove 321 and the second lug groove 322 is small, and the snow column shear force is not sufficiently improved, and thus the performance on snow cannot be sufficiently exhibited. According to this configuration, the above-described region 32A where the groove widths of the first lug groove 321 and the second lug groove 322 change and rigidity of the land portion tends to decrease can be provided with the raised bottom portions 321B1, 322B1, respectively, and thus rigidity of the land portion is ensured and performance on ice can be improved. Furthermore, by sufficiently taking snow into the first lug groove 321 and the second lug groove 322, the snow column shear force is improved and performance on snow can be improved.

Further, in the present embodiment, the second land portion 32 on the inner side in the vehicle width direction includes a plurality of sipes 4 in the tread surface 12. In the present embodiment, the plurality of sipes 4 are disposed parallel with the first lug groove 321, and are inclined upward to the right in the drawing along with the first lug groove 321.

Here, among the plurality of sipes 4, a pair of sipes adjacent to the broad width portion 321A (one end side) of the first lug groove 321 in the tire circumferential direction is defined as first sipes 41, and a pair of sipes adjacent to the narrow width portion 322A (one end side) of the second lug groove in the tire circumferential direction are defined as second sipes 42. In the present embodiment, the pair of first sipes 41 each have an end portion 41A on the side toward the shoulder main groove 21 that terminates in the second land portion 32. In contrast, the pair of second sipes 42 each have an end portion 42B on the side toward the center main groove 22 that opens to the center main groove 22.

According to this configuration, the pair of first sipes 41 adjacent to the broad width portion 321A of the first lug groove 321 having a wide groove width in the tire circumferential direction are terminated in the land portion without opening to the shoulder main groove 21, so that rigidity of the land portion can be relatively increased. In addition, the pair of second sipes 42 adjacent to the narrow width portion 322A of the second lug groove 322 having a narrow groove width in the tire circumferential direction are opened to the center main groove 22, so that rigidity of the land portion can be relatively reduced. As a result, a local bias in rigidity of the land portion can be suppressed for the entire second land portion 32 and contact with the ground is improved, and thus performance on ice can be improved.

Additionally, in the present embodiment, the second land portion 32 includes a plurality of separated portions 32B where the plurality of sipes 4 (including the first sipe 41 and the second sipe 42 described above) are disposed being separated in the tire width direction. The separated portions 32B are regions where the sipes 4 are disconnected continuously, and many of the separated portions 32B are provided in the region 32A where the first lug groove 321 and the second lug groove 322 overlap in the tire width direction.

According to this configuration, the above-described region 32A where the groove widths of the first lug groove 321 and the second lug groove 322 change and rigidity of the land portion tends to decrease can be provided with the separated portion 32B in which the sipes 4 are disposed being separated, respectively, and thus rigidity of the land portion can be ensured and performance on ice can be improved.

The tire 1 according to the present embodiment includes the second land portion 32 defined by the shoulder main groove 21 (one circumferential main groove) extending in the tire circumferential direction and the center main groove 22 (other circumferential main groove), and a plurality of sets of a first lug groove 321 and a second lug groove 322 that extend in the second land portion 32 in the tire width direction and are disposed alternately in the tire circumferential direction. The first lug groove 321 has one end that opens to the shoulder main groove 21 and an other end that terminates inside the second land portion 32 in which the groove width on one end side is formed wider than the groove width on the other end side, and the second lug groove 322 has one end that opens to the center main groove 22 and an other end that terminates inside the second land portion 32 in which the groove width on one end side is formed narrower than the groove width on the other end side and the narrow width portion 322A of the second lug groove 322 that is formed narrow is closed at ground contact, and thus performance on snow and performance on ice and wet performance can be provided in a compatible manner.

Figure 3:
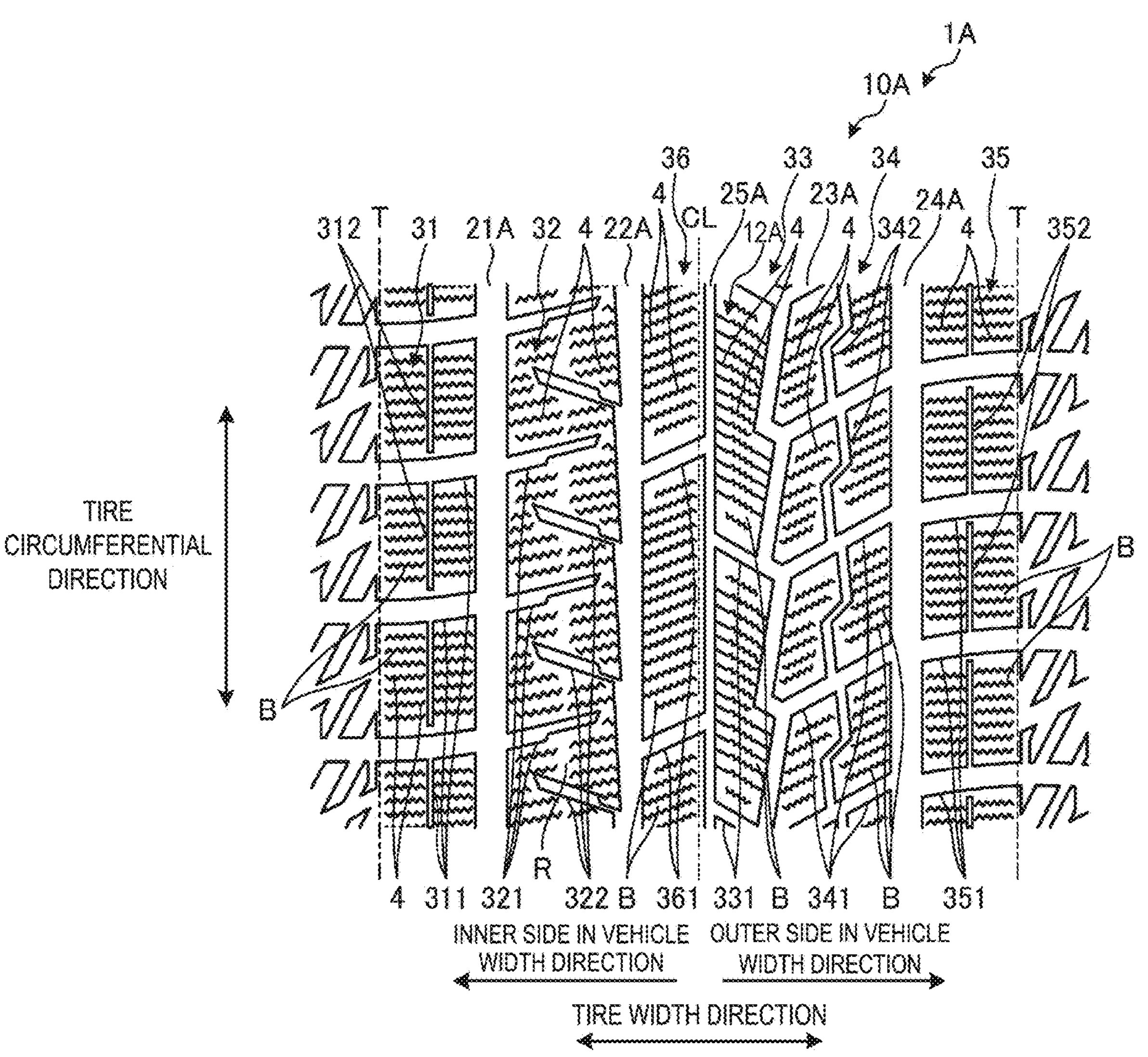
FIG. 3 is a plan view illustrating a tread surface of a pneumatic tire according to another embodiment.

Next, another embodiment will be described. FIG. 3 is a plan view illustrating a tread surface of a pneumatic tire according to another embodiment. Components that are the same as those of the above-described embodiment have the same reference sign and the description thereof is omitted. In the above-described embodiment, the tire 1 has a configuration including four circumferential main grooves 21 to 24 extending in the tire circumferential direction in the tread surface 12, but a difference in this another embodiment is that a pneumatic tire 1A (hereinafter referred to simply as the tire 1A) includes five circumferential main grooves 21A to 25A in the tread surface 12A of the tread portion 10A.

Specifically, with the tire equatorial plane CL as the boundary, two circumferential main grooves 21A, 22A are provided on the inner side in the vehicle width direction, two circumferential main grooves 23A, 24A are provided on the outer side in the vehicle width direction, and one circumferential main groove 25A is provided on the tire equatorial plane CL, respectively, as illustrated in FIG. 3. Similar to the embodiment described above, the circumferential main grooves 21A, 24A on the outermost side in the tire width direction are defined as the shoulder main grooves, and the circumferential main grooves 22A, 23A on the inner side in the tire width direction of the shoulder main groove are defined as the second main grooves. Furthermore, the circumferential main groove 25A is defined as the center main groove.

In this embodiment, six land portions 31 to 36 extending in the tire circumferential direction are defined and formed by the five circumferential main grooves 21A to 25A in the tread surface 12A. In this embodiment, the new center land portion 36 is formed in addition to the center land portion 33 by the two second main grooves 22A, 23A and the center main groove 25A. The center land portion 36 includes a plurality of lug grooves 361. The lug groove 361 is formed extending in the tire width direction between the second main groove 22A and the center main groove 25A, and both end portions are open to the second main groove 22A and the center main groove 25A, respectively. The center land portion 36 is partitioned into a plurality of blocks B by a plurality of lug grooves 361, and a plurality of sipes 4 extending in the tire width direction are provided in each block B.

This another embodiment also includes a plurality of sets of a first lug groove 321 and a second lug groove 322 each disposed alternately in the tire circumferential direction in the second land portion 32 on the inner side in the vehicle width direction defined by the shoulder main groove 21A (one circumferential main groove) and the second main groove 22A (other circumferential main groove). The first lug groove 321 has one end that opens to the shoulder main groove 21A and an other end that terminates inside the second land portion 32 in which the groove width on one end side is formed wider than the groove width on the other end side, and the second lug groove 322 has one end that opens to the second main groove 22A and an other end that terminates inside the second land portion 32 in which the groove width on one end side is formed narrower than the groove width on the other end side and the narrow width portion 322A of the second lug groove 322 that is formed narrow is closed at ground contact, and thus performance on snow and performance on ice and wet performance can be provided in a compatible manner.

EXAMPLES

FIGS. 4A-4D include a table showing the results of performance tests of tires according to the present embodiment. In the performance tests, (1) braking performance on ice, (2) braking performance on snow, and (3) wet braking performance were evaluated for a plurality of types of test tires. Furthermore, the test tires having a tire size of 195/65R1591Q were assembled on specified rims having a rim size of 15×6.5 J, and a specified air pressure (front wheel; 250 kPa, rear wheel: 240 kPa) was applied to the test tires. Further, the test tires were mounted on all wheels of a test vehicle being a front-engine front-drive (FF) vehicle with an engine displacement of 1800 cc.

(1) In the evaluation for braking performance on ice, the test vehicle traveled on a predetermined icy road surface, and a braking distance from the travel speed 40 (km/h) was measured. The measurement results are expressed as index values and evaluated with Conventional Example being assigned as the reference (100). In the evaluation, larger values indicate superior braking performance on ice.

(2) In the evaluation for braking performance on snow, the test vehicle traveled on a predetermined snowy road surface, and the braking distance from the travel speed 40 (km/h) was measured. The measurement results are expressed as index values and evaluated with Conventional Example being assigned as the reference (100). In the evaluation, larger values indicate superior braking performance on snow.

(3) In the evaluation for wet braking performance, the test vehicle traveled on a predetermined wet road surface, and the braking distance from the travel speed 40 (km/h) was measured. The measurement results are expressed as index values and evaluated with Conventional Example being assigned as the reference (100). In the evaluation, larger values indicate superior wet braking performance (drainage performance).

In contrast, Examples 1 to 14, which are examples of the tire according to the present technology, are each provided with a first lug groove and a second lug groove that terminate on one side in a second land portion on the inner side in the vehicle width direction defined by a straight-shaped shoulder main groove and a zigzag-shaped center main groove, with the first lug groove being formed wider on the opening side and the second lug groove being formed narrower on the opening side. Furthermore, the tires according to Examples 1 to 14 are different in the groove width ratio Wa1/Wa2 of the broad width portion and the narrow width portion in the first lug groove, the groove width ratio Wb1/Wb2 of the broad width portion and the narrow width portion in the second lug groove, the ratio W2/W1 of the maximum width of the second land portion and the width of the overlapping region, inclination angles θ1, θ2 of the first lug groove and the second lug groove, the angle difference θ2−θ1, the ratio La1/La (Lb1/Lb) of the groove length and the length of the raised bottom portion of the first lug groove and the second lug groove, the presence of an opening of the pair of first sipes, and the presence of the separated portions of the sipes in the overlapping region, respectively.

In addition, Conventional Example includes a through lug groove with a constant groove width that extends perpendicular to the circumferential main groove in a land portion defined by a pair of straight-shaped circumferential main grooves and extends through both circumferential main grooves, and a plurality of sipes that are parallel with the through lug groove and opening to both circumferential main grooves. These sipes are continuous sipes, and there are no separated portions that are separated in the middle. Additionally, Comparative Example has the same configuration as Example 1 except that the narrow width portion located on the opening side of the second lug groove is formed with a groove width that is not closed when the tire comes into contact with the ground.

As a result of performing the performance evaluation tests using these test tires, it was revealed as indicated in FIGS. 4A-4D that compared with Conventional Example and Comparative Example, the tires according to Examples 1 to 14 can improve braking performance on ice, braking performance on snow, and wet braking performance. In other words, the tires according to Examples 1 to 14 can provide braking performance on ice and braking performance on snow and wet braking performance in a compatible manner.

While the embodiments of the present technology have been described above, the present technology is not limited to the embodiments described above. For example, in the present embodiment, a pneumatic tire has been described as an example of a tire but is not limited to this, and the present embodiment can naturally be applied to a tire that is not filled with air, such as an airless tire. A gas to be filled in the pneumatic tire illustrated in the present embodiment may be an inert gas such as nitrogen, argon, and helium in addition to ordinary air or air with an adjusted oxygen partial pressure.

The invention claimed is:

1. A tire, comprising:

two circumferential main grooves that extend in a tire circumferential direction;

a land portion defined by the circumferential main grooves, the land portion being continuous in the tire circumferential direction and the land portion being continuous in a tire width direction between the circumferential main grooves; and a plurality of sets of a first lug groove and a second lug groove that extend in a direction intersecting the circumferential main grooves in the land portion and are alternately disposed in the tire circumferential direction, the first lug groove comprising one end that opens to one of the circumferential main grooves and an other end that terminates inside the land portion, a groove width on a side of the one end being formed wider than a groove width on a side of the other end, the second lug groove comprising one end that opens to an other one of the circumferential main grooves and an other end that terminates inside the land portion, a groove width on a side of the one end being formed narrower than a groove width on a side of the other end, and the side of the one end of the second lug groove that is formed narrower being closed at ground contact, and the first lug groove and the second lug groove each have a groove width of greater than 1.0 mm at a groove depth of 3.0 mm or more.

2. The tire according to claim 1, wherein the first lug groove has a groove width Wa1 on the side of the one end and a groove width Wa2 on the side of the other end satisfying a relationship $1.50 \leq Wa1/Wa2 \leq 3.0$, and the second lug groove has a groove width Wb1 on the side of the one end and a groove width Wb2 on the side of the other end satisfying a relationship $0.2 \leq Wb1/Wb2 \leq 0.75$.

3. The tire according to claim 2, wherein the first lug groove and the second lug groove each comprise a groove width change portion in which a groove width changes, and each groove width change portion is provided in a region in which the first lug groove and the second lug groove overlap in the tire width direction.

4. The tire according to claim 3, wherein a width W2 of the region in the tire width direction and a maximum width W1 of the land portion in the tire width direction satisfy a relationship $0.50 \leq W2/W1 \leq 0.70$.

5. The tire according to claim 4, wherein the first lug groove and the second lug groove are inclined in mutually opposite directions with respect to the tire circumferential direction, and inclination angles θ1, θ2 of the first lug groove and the second lug groove with respect to the tire circumferential direction satisfy $95° \leq \theta 1 \leq 125°$, $95° \leq \theta 2 \leq 125°$, and $5° \leq \theta 2 - \theta 1 \leq 15°$, respectively.

6. The tire according to claim 5, wherein the first lug groove and the second lug groove each comprise a raised bottom portion comprising a groove bottom raised on the side of the other end, and lengths La1, Lb1 of the raised bottom portion in the tire width direction and each of length La, Lb of the first lug groove and the second lug groove in the tire width direction satisfy relationships $0.30 \leq La1/La \leq 0.40$ and $0.30 \leq Lb1/Lb \leq 0.40$, respectively.

7. The tire according to claim 6, wherein the one of the circumferential main grooves comprises a groove wall that forms an edge of the land portion and has a straight shape, and the other one of the circumferential main grooves comprises a groove wall that forms an edge of the land portion and has a zigzag shape in which the groove wall oscillates in the tire width direction while extending in the tire circumferential direction.

8. The tire according to claim 7, wherein the land portion comprises a plurality of sipes extending in the tire width direction, and of the plurality of sipes, a sipe disposed on the side of the one end of the first lug groove and adjacent to the first lug groove in the tire circumferential direction comprises an end portion toward one of the circumferential main grooves that terminates inside the land portion, and a sipe disposed on the side of the one end of the second lug groove and adjacent to the second lug groove in the tire circumferential direction opens to the other one of the circumferential main grooves.

9. The tire according to claim 8, wherein the land portion comprises a separated portion in which the plurality of sipes are disposed separated in the tire width direction, and the separated portion is provided in a region in which the first lug groove and the second lug groove overlap in the tire width direction.

10. The tire according to claim 9, wherein the land portion in which the first lug groove and the second lug groove are disposed is disposed on an inner side in a vehicle width direction demarcated by a tire equatorial plane when a tire is mounted on a vehicle.

11. The tire according to claim 1, wherein the first lug groove and the second lug groove each comprise a groove width change portion in which a groove width changes, and each groove width change portion is provided in a region in which the first lug groove and the second lug groove overlap in the tire width direction.

12. The tire according to claim 11, wherein a width W2 of the region in the tire width direction and a maximum width W1 of the land portion in the tire width direction satisfy a relationship $0.50 \le W2/W1 \le 0.70$.

13. The tire according to claim 1, wherein the first lug groove and the second lug groove are inclined in mutually opposite directions with respect to the tire circumferential direction, and inclination angles θ1, θ2 of the first lug groove and the second lug groove with respect to the tire circumferential direction satisfy $95° \le \theta 1 \le 125°$, $95° \le \theta 2 \le 125°$, and $5° \le \theta 2 - \theta 1 \le 15°$, respectively.

14. The tire according to claim 1, wherein the first lug groove and the second lug groove each comprise a raised bottom portion comprising a groove bottom raised on the side of the other end, and lengths La1, Lb1 of the raised bottom portion in the tire width direction and each of length La, Lb of the first lug groove and the second lug groove in the tire width direction satisfy relationships $0.30 \le La1/La \le 0.40$ and $0.30 \le Lb1/Lb \le 0.40$, respectively.

15. The tire according to claim 1, wherein the one of the circumferential main grooves comprises a groove wall that forms an edge of the land portion and has a straight shape, and the other one of the circumferential main grooves comprises a groove wall that forms an edge of the land portion and has a zigzag shape in which the groove wall oscillates in the tire width direction while extending in the tire circumferential direction.

16. The tire according to claim 1, wherein the land portion comprises a plurality of sipes extending in the tire width direction, and of the plurality of sipes, a sipe disposed on the side of the one end of the first lug groove and adjacent to the first lug groove in the tire circumferential direction comprises an end portion toward the one of the circumferential main grooves that terminates inside the land portion, and a sipe disposed on the side of the one end of the second lug groove and adjacent to the second lug groove in the tire circumferential direction opens to the other one of the circumferential main grooves.

17. The tire according to claim 16, wherein the land portion comprises a separated portion in which the plurality of sipes are disposed separated in the tire width direction, and the separated portion is provided in a region in which the first lug groove and the second lug groove overlap in the tire width direction.

18. The tire according to claim 1, wherein the land portion in which the first lug groove and the second lug groove are disposed is disposed on an inner side in a vehicle width direction demarcated by a tire equatorial plane when a tire is mounted on a vehicle.

19. A tire, comprising: two circumferential main grooves that extend in a tire circumferential direction; a land portion defined by the circumferential main grooves, the land portion being continuous in the tire circumferential direction and the land portion being continuous in a tire width direction between the circumferential main grooves; and a plurality of sets of a first lug groove and a second lug groove that extend in a direction intersecting the circumferential main grooves in the land portion and are alternately disposed in the tire circumferential direction, the first lug groove comprising one end that opens to one of the circumferential main grooves and an other end that terminates inside the land portion, a groove width on a side of the one end being formed wider than a groove width on a side of the other end, and the second lug groove comprising one end that opens to an other one of the circumferential main grooves and an other end that terminates inside the land portion, a groove width on a side of the one end being formed narrower than a groove width on a side of the other end, and the side of the one end of the second lug groove that is formed narrower being closed at ground contact, wherein the first lug groove and the second lug groove each comprise a groove width change portion in which a groove width changes, and each groove width change portion is provided in a region in which the first lug groove and the second lug groove overlap in the tire width direction, and the first lug groove and the second lug groove each have a groove width of greater than 1.0 mm at a groove depth of 3.0 mm or more.

* * * * *